C. C. LEINEWEBER.
GRAIN DIVIDING ATTACHMENT FOR HARVESTERS.
APPLICATION FILED MAY 4, 1911.

1,025,753.

Patented May 7, 1912.

Witnesses
L. B. James
O. B. Hopkins

Inventor
Charles C. Leineweber.
by H. B. Willson & Co.
Attorneys

UNITED STATES PATENT OFFICE.

CHARLES C. LEINEWEBER, OF FIRTH, NEBRASKA.

GRAIN-DIVIDING ATTACHMENT FOR HARVESTERS.

1,025,753. Specification of Letters Patent. Patented May 7, 1912.

Application filed May 4, 1911. Serial No. 625,036.

*To all whom it may concern:*

Be it known that I, CHARLES C. LEINEWEBER, a citizen of the United States, residing at Firth, in the county of Lancaster and State of Nebraska, have invented certain new and useful Improvements in Grain-Dividing Attachments for Harvesters; and I do declare the following to be a full, clear, and exact description of the invention, such as will enable others skilled in the art to which it appertains to make and use the same.

This invention relates to grain dividers for harvesting machines.

The object of the invention is to provide a simply constructed and efficient divider so connected to the harvester as to divide and throw the grain divided in opposite directions on either side of the path of the drive wheel of the harvester.

With this and other objects in view, the invention consists of certain novel features of construction, combination and arrangement of parts as will be more fully described and particularly pointed out in the appended claims.

Figure 1:
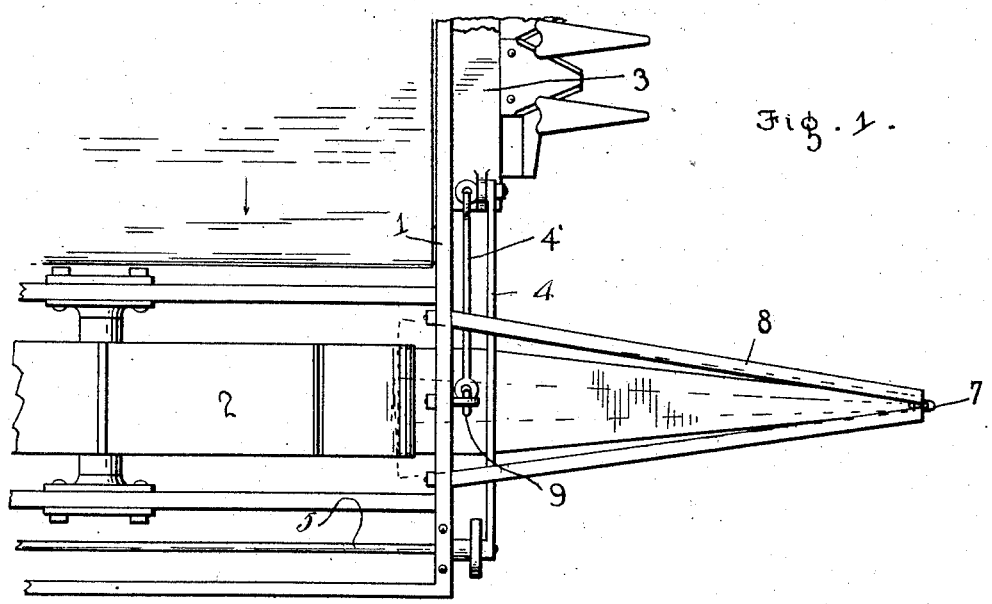
Figure 2:
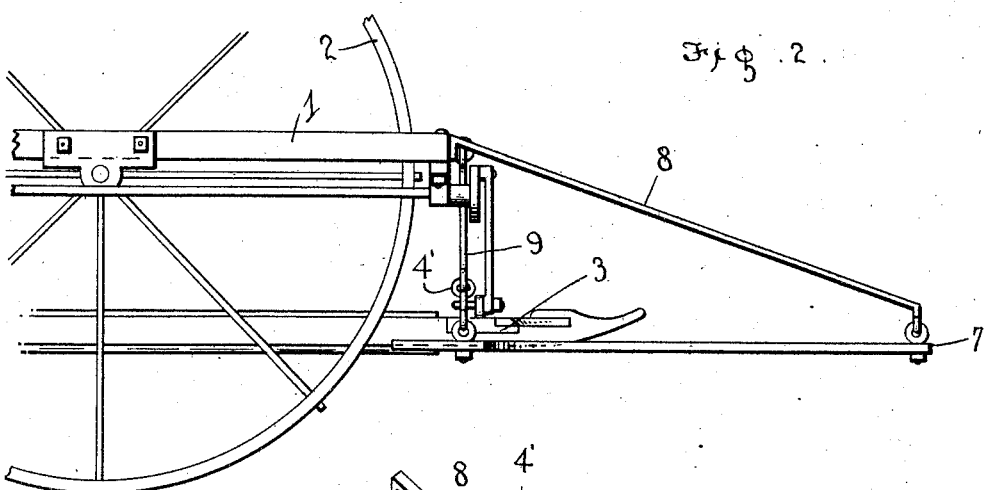
Figure 3:
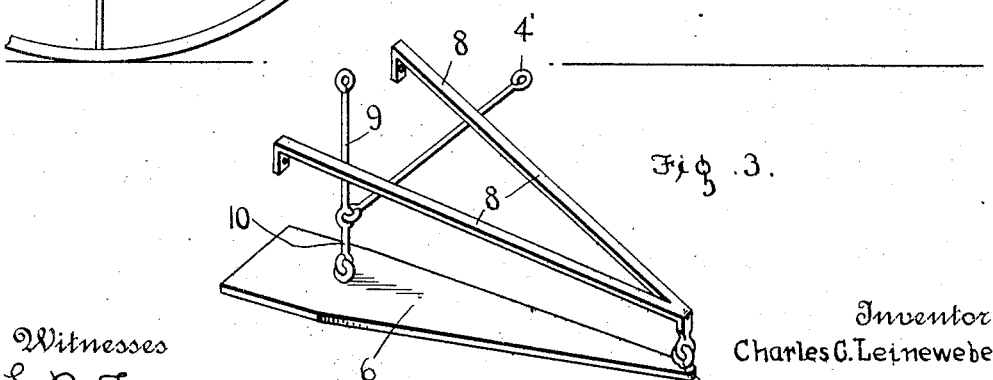

In the accompanying drawings: Figure 1 is a top plan view of a portion of a harvester showing this improved attachment applied; Fig. 2 is a side elevation thereof; Fig. 3 is a perspective view of the attachment detached.

In the embodiment illustrated, a frame 1 of the harvester is shown in which the usual drive or master wheel 2 is mounted. The sickle bar 3 is connected by the usual transversely arranged pitman 4 to the sickle shaft 5.

This improved divider comprises a plate 6 of any suitable material which is secured to the frame 1 in horizontal position in front of the master wheel 2 and tapers toward its front end to a point 7. This point 7 is pivotally connected to a suitable supporting brace, here shown in the form of a V-shaped member 8, the apex of which is bent laterally and pivoted to the point of the tapered plate 6. This V-shaped member 8 inclines upwardly and rearwardly and the free ends of the diverging arms thereof are fixed to the machine frame in a plane above the plate 6. A supporting member 9 is pivotally connected at one end to the frame 1 in a plane between the diverging arms of the member 8, and the other end 10 thereof is loosely connected to the plate 6, preferably near the rear end thereof. The sickle bar 3 is also connected to the member 9 by an auxiliary pitman 4' and when the machine is in operation the reciprocation of the sickle bar imparts motion to the plate 6 and oscillates it laterally in front of the master wheel, thereby causing it to force the grain through which it passes in opposite directions out of the path of the master wheel which passes through the grain so divided without crushing the heads thereof, whereby a large amount of grain is saved.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim is:

1. A grain dividing attachment for harvesting machines comprising a substantially triangular member adapted to be mounted adjacent to and in advance of the driving wheel of the machine with its apex extending forwardly, a brace pivotally connected at one end to the apex of said member, means for connecting the rear end of said triangular member to the frame of the machine to which it is to be applied and means for connecting said triangular member to the sickle bar of the machine.

2. A grain dividing attachment for harvesting machines comprising a pointed member adapted to be mounted adjacent to and in advance of the drive wheel of a machine, upwardly and rearwardly inclined brace bars pivotally connected at their lower ends to the front end of said pointed member, and means for connecting said pointed member to the sickle bar of the machine to provide for the lateral oscillation of said member.

3. A grain dividing attachment for harvesting machines comprising a pointed member adapted to be mounted adjacent to and in advance of the drive wheel of a machine, upwardly and rearwardly inclined brace bars pivotally connected at one end to the front end of said pointed member, a member pivotally connected to said pointed member near its rear end.

4. The combination with a harvesting machine having a drive wheel and a reciprocating sickle bar, of a grain dividing attachment comprising a pointed member arranged in advance of said drive wheel, an upwardly and rearwardly inclined brace member pivotally connected at one end with said pointed member, and rigidly attached at its other end to said machine, a supporting member pivotally connected with said pointed member and secured to the machine frame, and a pitman connected at one end to said sickle bar and at its other end to said supporting member whereby a laterally oscillating motion is imparted to said pointed member.

In testimony whereof I have hereunto set my hand in presence of two subscribing witnesses.

CHARLES C. LEINEWEBER.

Witnesses:
F. B. DRAPER,
SALLIE PINNEO.